United States Patent
Tomschke et al.

(10) Patent No.: US 8,678,315 B2
(45) Date of Patent: Mar. 25, 2014

(54) STRUT SYSTEM FOR THE STABILIZATION OF THE SHELL OF AN AERODYNAMIC AIRCRAFT COMPONENT FOR A COMMERCIAL AIRCRAFT

(75) Inventors: Bernd Tomschke, Hamburg (DE); Pasquale Basso, Hamburg (DE)

(73) Assignees: Airbus SAS, Blagnac (FR); Airbus Operations GmbH, Hamburg (DE)

( * ) Notice: Subject to any disclaimer, the term of this patent is extended or adjusted under 35 U.S.C. 154(b) by 323 days.

(21) Appl. No.: 13/019,612

(22) Filed: Feb. 2, 2011

(65) Prior Publication Data
US 2011/0215201 A1    Sep. 8, 2011

Related U.S. Application Data

(60) Provisional application No. 61/310,013, filed on Mar. 3, 2010.

(30) Foreign Application Priority Data

Mar. 3, 2010    (DE) .................... 10 2010 010 168

(51) Int. Cl.
*B64C 3/18*    (2006.01)
*B64C 3/22*    (2006.01)
*B64C 3/26*    (2006.01)

(52) U.S. Cl.
USPC .................. 244/123.4; 244/123.1; 244/132; 244/131

(58) Field of Classification Search
USPC ......... 244/91, 123.4, 123.1, 131, 119, 117 R, 244/132
See application file for complete search history.

(56) References Cited

U.S. PATENT DOCUMENTS

| 1,540,105 | A | * | 6/1925 | Cook, Jr. ...................... 244/132 |
| 1,791,827 | A | | 2/1931 | Miburn |
| 1,924,881 | A | | 8/1933 | Ragsdale |
| 2,014,801 | A | * | 9/1935 | Flader ...................... 244/123.4 |
| 2,362,033 | A | | 11/1944 | Snyder |
| 2,382,357 | A | * | 8/1945 | Watter ...................... 244/123.4 |
| 7,481,398 | B2 | * | 1/2009 | Schimmler et al. ........ 244/123.4 |
| 7,597,287 | B2 | | 10/2009 | Gay |
| 2008/0245927 | A1 | * | 10/2008 | Kulesha ..................... 244/123.1 |
| 2010/0108810 | A1 | * | 5/2010 | Barros et al. ............... 244/123.1 |

FOREIGN PATENT DOCUMENTS

DE    43 15 600 A1    11/1994

* cited by examiner

*Primary Examiner* — Tien Dinh
*Assistant Examiner* — Richard R Green
(74) *Attorney, Agent, or Firm* — Lucas & Mercanti, LLP

(57) ABSTRACT

The invention relates to a strut system for the stabilization of the shell (2) of an aerodynamic aircraft component in a commercial aircraft, comprising a pair of connection supports (4a, 4b) connected on the inside to the shell (2) and opposing each other, between which connection supports (4a, 4b) several struts (5) extend to form a latticework structure (3), which struts (5) in nodal points (6a, 6b) arranged on the ends are non-detachably connected to the connection supports (4a, 4b), wherein the area extension of the latticework structure (3) is aligned in such a manner relative to a middle plane of symmetry (11) that the struts (5), formed with an open symmetrical cross section, as well as the cross section of the connection supports (4a, 4b), are arranged so as to be symmetrical to the aforesaid.

9 Claims, 2 Drawing Sheets

STRUT SYSTEM FOR THE STABILIZATION OF THE SHELL OF AN AERODYNAMIC AIRCRAFT COMPONENT FOR A COMMERCIAL AIRCRAFT

This application claims the priority under 35 USC 119 of U.S. Provisional Application No. 61/310,013 filed Mar. 3, 2010 and German application No. 10 2010 010 168.0 filed Mar. 3, 2010, both applications are incorporated herein by reference.

TECHNICAL FIELD

The invention relates to a strut system for the stabilisation of the shell of an aerodynamic aircraft component for a commercial aircraft, comprising a pair of connection supports connected on the inside to the shell and opposing each other, between which connection supports several struts extend to form a latticework structure, which struts in nodal points arranged on the ends are connected to the connection supports.

The field of application of the present invention relates to aircraft construction, in particular the construction of commercial aircraft with large-volume fuselages on which aerodynamic aircraft components such as aerofoils, vertical tail units and horizontal stabilisers are arranged. All these aircraft parts comprise an aerodynamic profile that in some sections is slightly curved, and in principle comprise a non-self-supporting shell made of light metal or of a fibre composite material, which shell on the inside is stiffened by a strut system in such a manner that the relatively thin shell does not deform.

BACKGROUND TO THE INVENTION

DE 43 15 600 A1 shows such a strut system for an aerodynamic aircraft component, which strut system essentially comprises several spars that are preferably spaced apart from each other so as to be parallel and side by side, and ribs which extend across the aforesaid, which ribs form a kind of box structure to which on both sides the shell is affixed. In this technical solution the ribs extend in the direction of the profile depth of the strut system. The longitudinal extension of the spars, which extend across the aforesaid, approximately corresponds to the span of the strut system.

While such a strut system ensures a high degree of stability of the aircraft component, the production effort is, however, quite considerable due to the multitude of spars and ribs.

U.S. Pat. No. 7,597,287 B2 shows another strut system for the shell of an aerodynamic aircraft component, which strut system solves the above-mentioned problem in that the inside struts are arranged according to the principle of a latticework structure and to this extent create stable triangular structures between the opposing connection supports. Such a latticework structure uses a far smaller number of individual struts, and as a result of the triangular structure comprises a high degree of stability per se. In this latticework construction the individual struts are connected to each other and to the connection supports by way of nodal plates, so-called V-plates. To this effect the individual struts comprise holes at their ends, through which holes a connecting element makes possible affixation to the nodal plate, which in turn forms part of the connection support.

According to the generally known state of the art, connection supports and struts usually comprise a metal sheet that can be formed in a simple manner. Usually T-cross sections or closed cross sections are used in order to ensure good stability. Apart from this it is, however, also possible to use fibre-reinforced plastics to produce a strut system. However, special production steps are necessary for this because this material is not formable and requires a special fastening technique. Moreover, in the case of carbon-fibre-reinforced plastics, most of the time closed cross sections are used, which are quite elaborate and expensive to manufacture. While these closed cross sections in the case of the hitherto-known strut systems that comprise fibre composite materials allow suitable force transmission between the interconnected individual components, they are, however, associated with an increase in the component weight as a result of the expensive and elaborate connections on the components to be connected.

It is thus the object of the present invention to create a strut system for the stabilisation of the shell of an aerodynamic aircraft component, which strut system, while involving as little manufacturing effort as possible, is distinguished by reduced weight while providing better stability.

PRESENTATION OF THE INVENTION

The object is met starting with a strut system according to the following items.

1. A strut system for the stabilisation of the shell of an aerodynamic aircraft component in a commercial aircraft, comprising a pair of connection supports connected on the inside to the shell and opposing each other, between which connection supports several struts extend to form a latticework structure, which struts in nodal points arranged on the ends are connected to the connection supports, wherein the area extension of the latticework structure is aligned in such a manner relative to a middle plane of symmetry that the struts, formed with an open symmetrical cross section, as well as the cross section of the connection supports, are arranged so as to be symmetrical to the aforesaid.

2. The strut system of item 1 above, wherein for connection of the connection support to the shell, on both sides of the plane of symmetry, rows of spaced apart individual mounting brackets are provided on the connection support at this position, which rows extend towards the outside.

3. The strut system of item 2 above, wherein a pair of opposite mounting brackets comprises an L-shaped cross section and is jointly affixed in a non-detachable manner to the connection support by rivets or the like, including said connection support.

4. The strut system of item 1 above, wherein the connection support is designed as an open profile that comprises a C-shaped to U-shaped cross section whose opening is aligned towards the shell.

5. The strut system of item 1 above, wherein the strut comprises a C-shaped to U-shaped cross section whose opening is aligned towards the plane of symmetry of the latticework structure.

6. The strut system of item 1 above, wherein the nodal point comprises nodal plates that are symmetrically opposite each other on both sides of the end region of the strut and of the adjoining connection support, which nodal plates in relation to material and geometry are constructed in such a manner that a non-rigid component connection between the strut and the connection support arises.

7. The strut system of item 6 above, wherein by way of rivets including the connection support as well as the strut opposing nodal plates are together non-detachably affixed to the aforesaid.

8. The strut system of item 1 above, wherein the latticework structure comprises a stable field structure in that two adjacent struts form a triangle with a section of one of the two connection supports.

9. The strut system of item 1 above, wherein on the face of the latticework structure in each case a cross brace extends in order to close off the triangles situated on the face.

10. The strut system of any one of the preceding items, wherein both the struts and the connection supports comprise a fibre-reinforced plastic.

11. The strut system of item 10 above, wherein the fibre-reinforced plastic is a carbon-fibre-reinforced synthetic resin material.

12. The strut system of any one of the preceding items, wherein the aerodynamic aircraft component is a vertical tail unit, a horizontal stabiliser or an aerofoil of a commercial aircraft.

The invention encompasses the technical teaching according to which the latticework structure in relation to its area extension is aligned in such a manner relative to a middle plane of symmetry that the struts, formed with an open symmetrical cross section, as well as the cross section of the connection supports, is arranged no as to be symmetrical to the aforesaid.

The solution according to the invention provides an advantage in particular in that thanks to the area symmetry any introduction of force into the latticework structure takes place perpendicularly to the shell, which is free of any offset moments. Thus, the latticework construction need not absorb such offset moments and to this extent can be designed in a simpler manner. In particular the many required struts between the connection supports can be made with open cross sections, which, apart from savings in materials, in particular results in a corresponding saving of weight, which saving with a view to the entire strut system is significant. The selection of open cross sections facilitates inspectability and ensures high manufacturing quality and good inspectability during use. As a result of the middle plane of symmetry, which forms the subject of the invention, of the latticework construction, forces within this plane are removed from the shell.

According to a measure that improves the invention, it is proposed that for connection of the connection support to the shell, on both sides of the plane of symmetry, at this location, rows of spaced apart individual mounting brackets be provided, which rows extend towards the outside on the connection support. In this manner an also symmetrical design is implemented in relation to the mounting brackets provided to introduce force into the latticework construction, in order to form an Ω-shaped mounting location. This mounting point is preferably implemented by means of a pair of opposite mounting brackets, each comprising an L-shaped cross section, and jointly affixed in a non-detachable manner to the connection support by rivets or the like, including said connection support. As a result of these individual components that are simple to produce, the desired force-symmetrical connection to the shell can be implemented in an efficient manner. Furthermore, the connection supports together with the shell result in a very rigid cross section also between nodes of the inner stiffening struts.

In view of the striven-for lightweight construction, both the individual struts and the opposing connection supports preferably comprise an open profile that comprises a C-shaped to U-shaped cross section. In this arrangement the opening of this profile is always aligned no as to be in symmetry with the plane of symmetry of the latticework structure. In the case of the connection supports their opening should be aligned towards the shell in order to form favourable manufacturing conditions for attaching the adjacent components, in particular the L-shaped mounting brackets and nodal plates. Said nodal plates are provided to form the nodal points of the latticework structure, to which preferably two struts extend to the connection support. Preferably, these nodal points are formed from nodal plates that are opposite each other on both sides of the end region of the struts concerned and of the adjacent connection support. In this arrangement, in relation to material and geometry, the nodal plates are constructed in such a manner that a non-rigid component connection between the struts concerned and the connection support arises. This non-rigid component connection ensures a slight hinge-like flexibility across the plane of symmetry of the latticework structure in order to in an advantageous manner eliminate undesirable moments between the shell and the latticework structure in this direction of effect. Such moments can result in undesirable material stress.

Preferably, by way of rivets including the connection support as well as the struts, the opposing nodal plates are together non-detachably affixed to the aforesaid. Tests have shown that at this position one row of rivets is perfectly adequate to ensure reliable affixation. This furthermore helps save weight.

According to a further measure that improves the invention it is proposed for the latticework structure to be designed in such a manner that two adjacent struts form a triangle with a section of one of the two connection supports. In this arrangement all the corner points of such triangles are situated within the box structure so that the shell does not have to transmit any offset moments, and thus local overstress is prevented a priori. By way of the individual triangles that are arranged in a row in such a manner, a stable field structure is achieved with the use of relatively few individual struts, which is advantageous in view of the use of material and the installation, and also in view of the lightest possible overall weight. In order to close off this latticework structure at the ends in a simple manner it is proposed that in those locations in each case a cross brace be arranged in order to also form triangles on the face.

Based on such a preferred latticework structure the struts and the connection supports can comprise a fibre-reinforced plastic, preferably a carbon-fibre-reinforced synthetic resin material. Against the background of the object stated above, this special Material/Structure combination has been shown to be particularly advantageous.

BRIEF DESCRIPTION OF THE DRAWINGS

Further measures that improve the invention are shown in detail below with reference to the figures together with the description of a preferred exemplary embodiment of the invention. The following are shown.

DETAILED DESCRIPTION OF EXEMPLARY EMBODIMENTS

Figure 1:
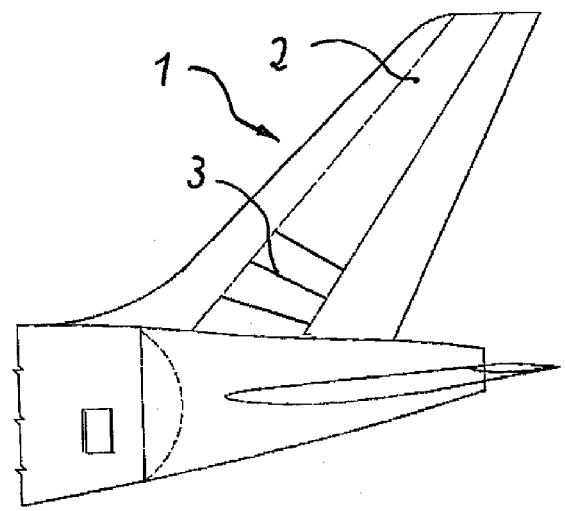
FIG. 1 a lateral view of a vertical tail unit with an interior strut system for stabilisation, FIG. 2 a top view of one of the strut systems in the vertical tail unit according to FIG. 1, FIG. 3 a perspective detail view of the connection support of the latticework structure at the point of connection to the shell, and FIG. 4 a diagrammatic longitudinal section and cross section in the region of a nodal point of the latticework structure.

According to FIG. 1, the vertical tail unit 1 shown as an aerodynamic aircraft component essentially comprises a shell 2 that is stabilised by means of an internal strut system in which a plural number of individual latticework structures 3 that are arranged adjacent and side-by-side to each other are integrated. The individual latticework structures 3 ensure that the relatively thin shell 2 of the vertical tail unit 1 remains adequately stiff.

Figure 2:
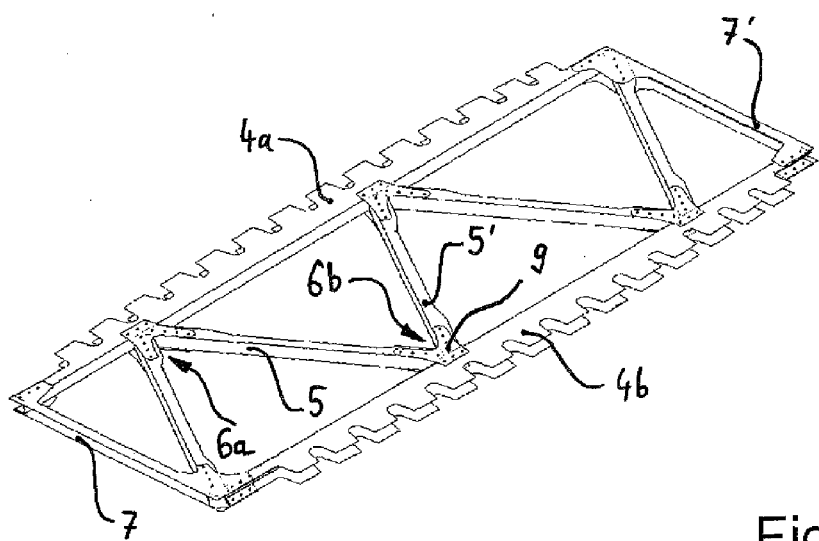

According to FIG. 2, each individual latticework structure 3 essentially comprises a pair of opposing connection supports 4a and 4b that on the interior are connected to the shell 2. Between the connection supports 4a and 4b several struts 5 extend, which in nodal points 6a and 6b at the ends are non-detachably connected to the adjacent connection supports 4a or 4b.

As a result of this, the latticework structure 3 has a stable field structure in that two adjacent struts 5 and 5' together with a section of one of the two connection supports 4a form a triangle. On the face side this triangular latticework structure 3 is closed off in that in each case cross braces 7 or 7' directly interconnect the opposing connection supports 4a and 4b.

In this exemplary embodiment both the individual struts 5, 5', etc. and the two opposing connection supports 4a and 4b are designed as open profiles, which for reasons of lightweight construction have been made from a carbon-fibre-reinforced plastic material.

The nodal points 6a, 6b, which are formed at the ends of the struts 5, 5', etc., together with the connection supports 4a or 4b are formed by way of individual nodal plates 9 (explained in more detail below), which nodal plates 9 by means of rivet connections form a stable nodal point 6a, 6b with said components.

Figure 3:
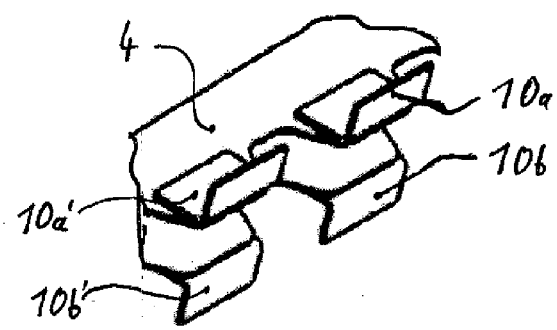

According to FIG. 3, in order to connect the connection support 4 (as an example) to the shell (not shown in detail), individual mounting brackets 10a and 10b, as well as 10a' and 10b' that extend on both sides of this towards the outside and that are spaced apart from each other, are arranged. Each of the mounting brackets 10a, 10b, 10a', 10b' comprises an L-shaped cross section and by means of rivets incorporating the connection support 4 is non-detachably connected to said connection support 4.

Figure 4:
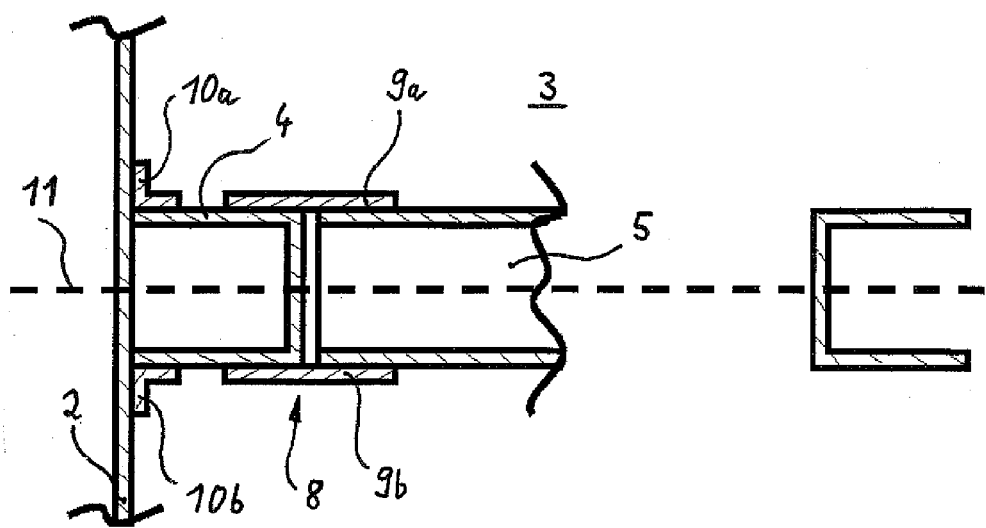

As shown in FIG. 4, the area extension of the latticework structure 3 is aligned with a middle plane of symmetry 11. In this special alignment the struts 5 that comprise an open symmetrical cross section as well as the cross section of the connection supports 4 are aligned so as to be symmetrical to this middle plane of symmetry 11.

In this exemplary embodiment the connection support 4 comprises an open profile with a U-shaped cross section whose opening is aligned towards the shell 2. The strut 5 also comprises a U-shaped cross section whose opening is aligned to the plane of symmetry 11 of the latticework structure 3. Overall this results in complete symmetry in relation to the middle plane of symmetry 11.

At the end of the strut 5, for connection to the adjacent connection support 4, nodal plates 9a and 9b are provided that are symmetrically opposite each other, which nodal plates 9a and 9b are riveted to said components. The connection point 8 is designed in such a manner that slight mobility from the middle plane of symmetry 11 is possible in order to eliminate undesirable moments in the region of the nodal point 6a; 6b.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Vertical tail unit
2 Shell
3 Latticework construction
4 Connection support
5 Strut
6 Nodal point
7 Cross brace
9 Nodal plate
10 Mounting bracket
11 Middle plane of symmetry

The invention claimed is:

1. A strut system for the stabilisation of a shell of an aerodynamic aircraft component in a commercial aircraft, comprising:
   a pair of connection supports connected to the inside of the shell and opposing each other,
   struts extend between and connected to the connection supports to form a latticework structure, which struts at nodal points arranged on the ends are connected to the connection supports,
   wherein an area extension of the latticework structure is aligned in such a manner relative to a middle plane of symmetry that the struts, formed with an open symmetrical cross section, as well as the cross section of the connection supports, are arranged so as to be symmetrical to the aforesaid,
   wherein the connection supports are connected to the shell, on both sides of the plane of symmetry by rows of spaced apart, individual, mounting brackets provided on the connection support, which rows extend towards the shell,
   wherein a pair of opposite mounting brackets each comprise an L-shaped cross section and are jointly affixed in a non-detachable manner to the connection support and to the shell,
   wherein the nodal point comprises nodal plates that are symmetrically opposite each other on both sides of the end region of the strut and of the adjoining connection support, which nodal plates in relation to material and geometry are constructed in such a manner that a non-rigid component connection due to a gap between the strut and the connection support arises.

2. The strut system of claim 1,
   wherein each of the connection supports is designed as an open profile that comprises a C-shaped to U-shaped cross section whose opening is aligned towards the shell.

3. The strut system of claim 1,
   wherein each of the struts comprises a C-shaped to U-shaped cross section.

4. The strut system of claim 1,
   wherein by way of rivets including the connection support the strut and opposing nodal plates are non-detachably riveted together.

5. The strut system of claim 1,
   wherein the latticework structure comprises a stable field structure in that two adjacent struts form a triangle with a section of one of the two connection supports.

6. The strut system of claim 1,
   wherein a cross brace extends between and is connected to the connection supports at each end of the latticework structure in order to close off the triangles situated on the end of the latticework structure.

7. The strut system of claim 1, wherein both the struts and the connection supports comprise a fibre-reinforced plastic.

8. The strut system of claim 7, wherein the fibre-reinforced plastic is a carbon-fibre-reinforced synthetic resin material.

9. The strut system of claim 1, wherein the aerodynamic aircraft component is a vertical tail unit, a horizontal stabiliser or an aerofoil of a commercial aircraft.

* * * * *